United States Patent
Hara et al.

(10) Patent No.: US 11,093,826 B2
(45) Date of Patent: Aug. 17, 2021

(54) EFFICIENT DETERMINATION OF OPTIMIZED LEARNING SETTINGS OF NEURAL NETWORKS

(71) Applicant: INTERNATIONAL BUSINESS MACHINES CORPORATION, Armonk, NY (US)

(72) Inventors: Satoshi Hara, Tokyo (JP); Takayuki Katsuki, Tokyo (JP); Tetsuro Morimura, Tokyo (JP); Yasunori Yamada, Saitama (JP)

(73) Assignee: International Business Machines Corporation, Armonk, NY (US)

( * ) Notice: Subject to any disclaimer, the term of this patent is extended or adjusted under 35 U.S.C. 154(b) by 1049 days.

(21) Appl. No.: 15/017,248

(22) Filed: Feb. 5, 2016

(65) Prior Publication Data

US 2017/0228639 A1  Aug. 10, 2017

(51) Int. Cl.
 *G06N 3/08* (2006.01)
 *G06N 3/04* (2006.01)
 *G06N 7/00* (2006.01)

(52) U.S. Cl.
 CPC ............. *G06N 3/08* (2013.01); *G06N 3/0454* (2013.01); *G06N 7/005* (2013.01)

(58) Field of Classification Search
 CPC ...... G06N 3/08; G06N 3/0454; G06N 99/005; G06N 3/082; G06N 7/005; G06N 3/04; G06N 3/0427; G06N 3/0472; G06N 5/022; G10L 15/16
 See application file for complete search history.

(56) References Cited

U.S. PATENT DOCUMENTS 5,479,571 A * 12/1995 Parlos ................... G06N 3/049
 706/25
6,304,864 B1 * 10/2001 Liddy ................. G06F 16/9535
 706/15
(Continued)

FOREIGN PATENT DOCUMENTS

CN 103164742 A 6/2013
CN 103544705 A 1/2014
(Continued)

OTHER PUBLICATIONS

D. K. Naikand R. J. Mammone. "Meta-Neural Networks that learn by learning" IEEE 1992 [ONLINE] Downloaded Jun. 6, 2019 https://ieeexplore.IEEE.org/stamp/stamp.jsp?tp=&arnumber=287172 (Year: 1992).*

(Continued)

*Primary Examiner* — Ben M Rifkin
(74) *Attorney, Agent, or Firm* — Tutunjian & Bitetto, P.C.; Randall Bluestone (57) ABSTRACT

Optimized learning settings of neural networks are efficiently determined by an apparatus including a processor and one or more computer readable mediums collectively including instructions that, when executed by the processor, cause the processor to train a first neural network with a learning setting; extract tentative weight data from the first neural network with the learning setting; calculate an evaluation value of the first neural network with the learning setting; and generate a predictive model for predicting an evaluation value of a second neural network with a new setting based on tentative weight data of the second neural network by using a relationship between the tentative weight data of the first neural network and the evaluation value of the first neural network.

19 Claims, 5 Drawing Sheets

(56) References Cited

U.S. PATENT DOCUMENTS

| | | | | |
|---|---|---|---|---|
| 6,561,992 | B1* | 5/2003 | Eberhart | A61B 5/1101 600/595 |
| 9,135,559 | B1 | 9/2015 | Chan et al. | |
| 2004/0260662 | A1* | 12/2004 | Staelin | G06N 3/08 706/16 |
| 2014/0344193 | A1 | 11/2014 | Bilenko et al. | |
| 2015/0340032 | A1* | 11/2015 | Gruenstein | G10L 15/16 704/232 |

FOREIGN PATENT DOCUMENTS

| | | |
|---|---|---|
| CN | 104299012 A | 1/2015 |
| CN | 104866810 A | 8/2015 |
| WO | 2015191652 A1 | 12/2015 |

OTHER PUBLICATIONS

Lutz Prechelt "Automatic early stopping using cross validation: quantifying the criteria" 1998 [ONLINE] Downloaded Jun. 6, 2019 https://reader.elsevier.com/reader/sd/pii/S0893608098000100?token=860C9F93DE6C6D498D8AEC7E801CCB83ED435AB6AC2D3A87E59C589ACF2728CCB363365BC3DE07B5CE5C8F488C2CDBEA (Year: 1998).*

G. E. Hinton et al. "Improving Neural Networks by preventing co-adaptation of feature detectors" 2012 [ONLINE] Downloaded Jun. 6, 2019 https://arxiv.org/pdf/1207.0580.pdf (Year: 2012).*

StatSoft. "Neural Networks" 2002 [ONLINE] Downlaoded Apr. 14, 2014 http://www.obgyn.cam.ac.uk/cam-only/statsbook/stneunet.html (Year: 2002).*

International Search Report and Written Opinion issued in International Application No. PCT/1132017/050504 dated May 16, 2017, pp. 1-11.

Dohman, T. et al., "Speeding up Automatic Hyperparameter Optimization of Deep Neural Networks by Extrapolation of Learning Curves," 24th International Joint Conference on Artificial Intelligence, Jun. 2015. (pp. 1-9).

Swersky, K et al., "Freeze-thaw bayesian optimization," Harvard University and University of Toronto, Jun. 2014. (pp. 1-12).

* cited by examiner

EFFICIENT DETERMINATION OF OPTIMIZED LEARNING SETTINGS OF NEURAL NETWORKS

BACKGROUND

Technical Field

The present invention relates to efficient determination of optimized learning settings of neural networks.

Related Art

Deep Neural Network (or DNN) becomes increasingly important as a method for machine learning. DNNs have a variety of settings (i.e., hyper parameters), and performance of DNNs is sensitive to those settings. Therefore, it is necessary to find optimal settings to improve performance of a DNN by training a number of DNNs with different settings. Due to high computational cost for completing training of DNNs with a large number of settings, a method for predicting an eventual model performance at an early stage of training has been recognized as useful for automated tuning of settings.

For example, automated early termination approaches are disclosed in "Domhan, T.; Springenberg, J. T.; and Hutter, F. 2015. Speeding up automatic hyperparameter optimization of deep neural networks by extrapolation of learning curves, Proceedings of the 24th International Joint Conference on Artificial Intelligence (IJCAI)" and "Swersky, K.; Snoek, J.; and Adams, R. P. 2014. Freeze-thaw bayesian optimization. arXiv preprint arXiv:1406.3896." However, the known methods lack prediction accuracy, and require a large number of simulations to construct a reliable predictive model, which still requires a large amount of processing.

SUMMARY

Therefore, it is an object of an aspect of the innovations herein to provide an apparatus capable of overcoming the above drawbacks accompanying the related art. The above and other objects can be achieved by the combinations recited in the claims According to a first aspect of the innovations herein, an apparatus includes a processor and one or more computer readable mediums collectively including instructions that, when executed by the processor, cause the processor to, train a first neural network with a learning setting; extract tentative weight data from the first neural network with the learning setting; calculate an evaluation value of the first neural network with the learning setting; and generate a predictive model for predicting an evaluation value of a second neural network with a new setting based on tentative weight data of the second neural network by using a relationship between the tentative weight data of the first neural network and the evaluation value of the first neural network. According to the first aspect of innovation, the apparatus may improve prediction accuracy of the predictive model while reducing the amount of processing, and thus may efficiently determine an optimized setting of the neural network.

In addition, it is a second aspect of the innovations herein to provide the apparatus of the first aspect, wherein the calculating the evaluation value calculates the evaluation value of the first neural network with the learning setting and weight data further trained from the tentative weight data. According to the second aspect, the apparatus may improve prediction accuracy of performance of the completely trained neural network by the predictive model based on further trained first neural networks.

In addition, it is a third aspect of the innovations herein to provide the apparatus of the second aspect, wherein the instructions further cause the processor to: train the second neural network with the new setting; and estimate the evaluation value of the second neural network with the new setting by using the predictive model before completion of training the second neural network with the new setting. According to the third aspect, the apparatus may efficiently predict the performance of the eventual second neural network from an incompletely trained second neural network.

In addition, it is a fourth aspect of the innovations herein to provide the apparatus of the third aspect, wherein the instructions further cause the processor to: terminate the training of the second neural network with the new setting in response to the evaluation value of the second neural network with the new setting not satisfying a criterion. According to the fourth aspect, the apparatus may further save computational resources of the apparatus for training neural networks.

In addition, it is a fifth aspect of the innovations herein to provide the apparatus of the fourth aspect, wherein the instructions further cause the processor to: generate a plurality of new settings; train a plurality of neural networks, each neural network including a respective new setting among the plurality of new settings; terminate the training of at least one neural network among the plurality of neural networks that does not satisfy the criterion; and select one new settings among the plurality of new settings, based on performances of the plurality of neural networks without the at least one neural network. According to a fifth aspect, the apparatus may efficiently determine an optimized setting of the neural network.

In addition, it is a sixth aspect of the innovations herein to provide the apparatus of the fifth aspect, wherein the instructions further cause the processor to: update the predictive model based on the plurality of neural networks without the at least one neural network. According to a sixth aspect, the apparatus may further improve accuracy of the predictive model.

In addition, it is a seventh aspect of the innovations herein to provide the apparatus of the second aspect, wherein the training of the first neural network with the learning setting includes a plurality of iterations, and wherein the tentative weight data of the first neural network with the learning setting is updated in each of the plurality of iterations. According to the seventh aspect, the apparatus may generate an accurate predictive model based on the tentative weight data.

In addition, it is an eighth aspect of the innovations herein to provide the apparatus of the seventh aspect, wherein the generation of the predictive model includes generating a function to estimate the evaluation value from the tentative weight data at two or more iterations of the plurality of iterations. According to the eighth aspect, the apparatus may generate an accurate predictive model based on the tentative weight data.

In addition, it is a ninth aspect of the innovations herein to provide the apparatus of the eighth aspect, wherein the two or more iterations are not consecutive. According to the ninth aspect, the apparatus may generate an accurate predictive model based on the tentative weight data.

In addition, it is a tenth aspect of the innovations herein to provide the apparatus of the eighth aspect, wherein the function is operable to estimate the evaluation value from differences between the tentative weight data of a first iteration of the plurality of iterations and the tentative weight data of a second iteration of the plurality of iterations.

According to the tenth aspect, the apparatus may generate an accurate predictive model based on the tentative weight data.

In addition, it is an eleventh aspect of the innovations herein to provide the apparatus of the first aspect, wherein the first and second neural networks are convolutional neural networks, and at least part of the tentative weight data is extracted from a last convolutional layer. According to the eleventh aspect, the apparatus may enable training of convolutional neural networks in an efficient manner.

In addition, it is a twelfth aspect of the innovations herein to provide the apparatus of the eleventh aspect, wherein the tentative weight data is extracted only from the last convolutional layer. According to the twelfth aspect, the apparatus may enable training of convolutional neural networks in an efficient manner.

In addition, it is a thirteenth aspect of the innovations herein to provide the apparatus of the first aspect, wherein the extracting the tentative weight data further normalizes the tentative weight data. According to the thirteenth aspect, the apparatus may generate an accurate predictive model based on the tentative weight data.

These aspects of the innovations may also include a computer-implemented method including operations performed by the apparatus, and a computer program product comprising a computer readable storage medium having program instructions embodied therewith, the program instructions executable to perform the method.

The summary clause does not necessarily describe all of the features of the embodiments of the present invention. The present invention may also be a sub-combination of the features described above. The above and other features and advantages of the present invention will become more apparent from the following description of the embodiments, taken in conjunction with the accompanying drawings.

DETAILED DESCRIPTION

Hereinafter, example embodiments of the present invention will be described. The embodiments should not be construed as limiting the scope of the invention, which is defined by the claims. The combinations of features described in the embodiments are not necessarily essential to the invention.

Figure 1:
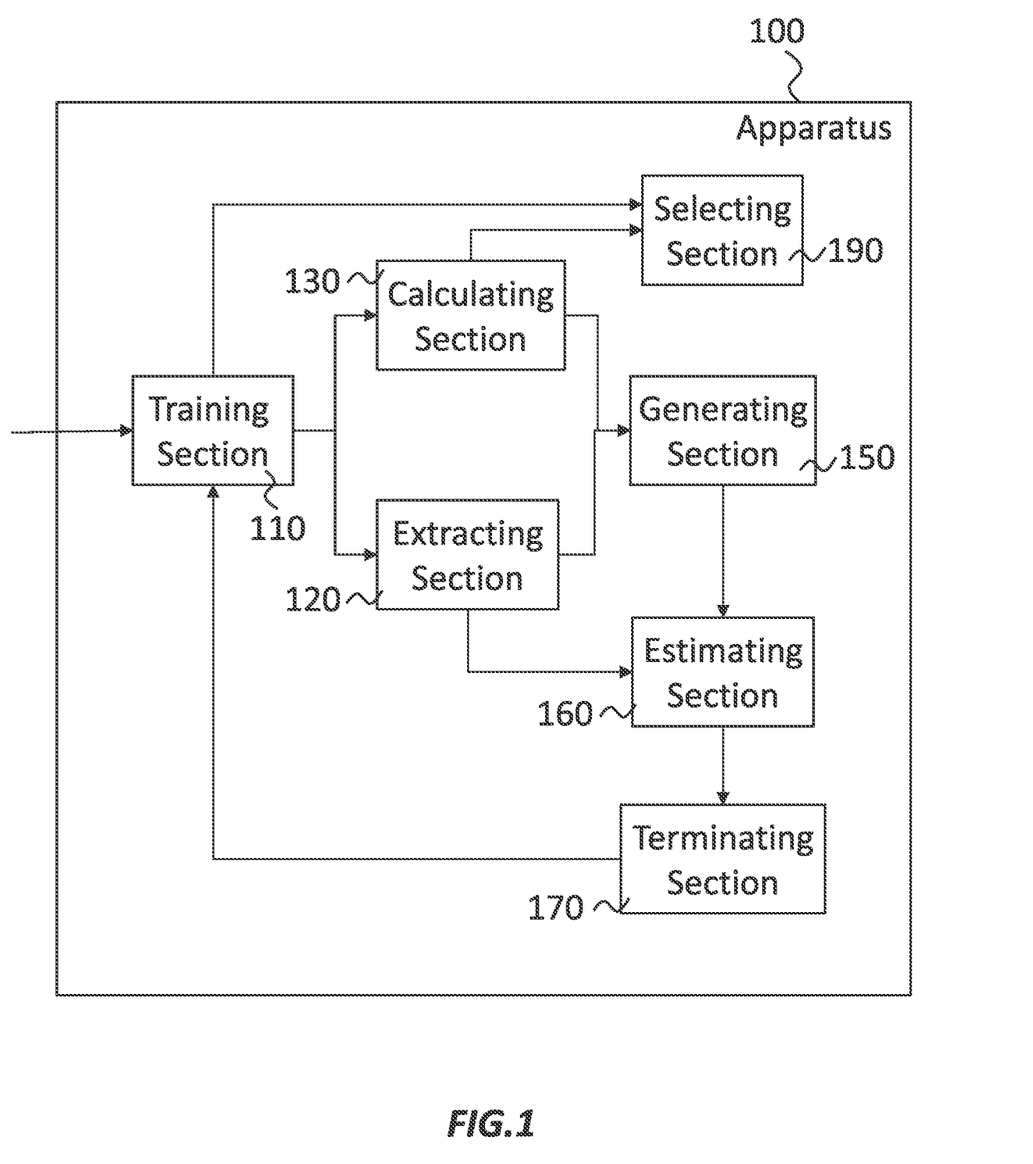
FIG. 1 shows an exemplary configuration of the apparatus 100, according to an embodiment of the present invention.

FIG. 1 shows an apparatus 100 according to an embodiment of the present invention. The apparatus 100 may train neural networks (e.g., Deep Neural Networks (DNNs) and Convolutional Neural Networks (CNNs)), generate a predictive model to predict a performance of eventual neural networks based on weight data of neural networks at an early stage of the trainings, and determine an optimal setting for the neural network in an efficient manner.

The apparatus 100 may comprise a processor and one or more computer readable mediums collectively including instructions. The instructions, when executed by the processor, may cause the processor to operate as a plurality of operating sections. Thereby, the apparatus 100 may be regarded as comprising a training section 110, an extracting section 120, a calculating section 130, a generating section 150, an estimating section 160, a terminating section 170, and a selecting section 190.

The training section 110 may obtain a training data for training neural networks and generating learning settings for learning neural networks. A detail about the learning settings is explained below. The training section 110 may train a first neural network with learning setting based on the training data in a model generation phase. A detail of the model generation phase is explained below in relation to FIG. 2. The first neural network may be used mainly for generation of a predictive model for prediction of performance of the neural network, which may include the first neural network. The training of the first neural network with the learning setting includes a plurality of iterations of updating of weight data of the first neural network. In one embodiment, each iteration may include processes of an input of the training data, an output of the output data, a back propagation of the first neural network, and an update of weight data of the first neural network.

The training section 110 may provide the extracting section 120 with tentative weight data from the first neural network with the learning setting. The tentative weight data of the first neural network with the learning setting is updated in each of the plurality of iterations. The tentative weight data may be the weight data obtained from a neural network before all of the iterations are finished.

The training section 110 may provide the calculating section 130 with the training data and the first neural network with the learning setting. For example, the training section 110 may provide the calculating section 130 with a completely trained neural network as the first neural network with the learning setting.

The training section 110 may generate a plurality of new settings and train a plurality of neural networks, each of which includes a respective new setting among the plurality of new settings. The new settings may be different from the learning settings. The training section 110 may train the neural network with the new setting as the second neural network with the new setting in a training completion phase. A detail of the training completion phase is explained below in relation to FIG. 2. The training section 110 may provide the extracting section 120 with the tentative weight data of the second neural network.

The training section 110 may not complete the training of the second neural network with a new setting based on a determination of the terminating section 170. The training section 110 may provide the calculating section 130 with a completely trained second neural network with the new setting. The training section 110 may provide the selecting section 190 with the completely trained first neural network and second neural network.

The extracting section 120 may extract the tentative weight data from the first neural network with the learning setting in a model generation phase, and extract the tentative weight data of the second neural network with the new setting in the training completion phase. The extracting section 120 may provide the generating section 150 and the estimating section 160 with the tentative weight data from the first and the second neural network.

The calculating section 130 may calculate an evaluation value of the first neural network with the learning setting and weight data further trained from the tentative weight data in the model generation phase. In one embodiment, the calculating section 130 may calculate the evaluation value of the first neural network with the learning setting and weight data completely trained in the model generation phase. The calculating section 130 may provide the evaluation value of the first neural network with the learning setting to the generating section 150 and the selecting section 190.

The calculating section 130 may calculate an evaluation value of the second neural network with the new setting. In one embodiment, the calculating section 130 may calculate the evaluation value of the second neural network with the new setting and weight data completely trained. The calculating section 130 may provide the evaluation value of the second neural network with the new setting to the selecting section 190 in the training completion phase. The calculating section 130 may perform the calculation based on an output value of the neural network and a desired output value included in the training data. A detail of methods for calculating the evaluation value is explained below.

The generating section 150 may generate a predictive model for predicting an evaluation value of a second neural network with a new setting based on tentative weight data of the second neural network by using a relationship between the tentative weight data of the first neural network and the evaluation value of the first neural network. The generating section 150 may generate the predictive model based on the tentative weight data from the first neural network extracted by the extracting section 120 and the evaluation value of the first neural network calculated by the calculating section 130 in the model generation phase. The generating section 150 may utilize a history of the tentative weight data in the iterations of the training. The generating section 150 may provide the estimating section 160 with the predictive model.

The estimating section 160 may estimate the evaluation value of the second neural network with the new setting by using the predictive model before completion of the training of the second neural network with the new setting in the training completion phase. The estimating section 160 may provide the terminating section 170 with the estimated evaluation value.

The terminating section 170 may terminate the training of at least one neural network among the plurality of neural networks that does not satisfy the criterion. For example, the terminating section 170 may cause the training section 110 to terminate the training of the second neural network with the new setting in response to the estimated evaluation value of the second neural network with the new setting not satisfying a criterion in the training completion phase.

The selecting section 190 may select one setting based on performances of neural networks of which training is not terminated. For example, the selecting section 190 may select a setting that gives a neural network the best evaluation value among the first neural networks, and, the second neural networks of which training is not terminated by the terminating section 170 in the training completion phase.

As explained above, the apparatus 100 may improve prediction accuracy of the predictive model, and thereby may efficiently determine an optimized setting of the neural network by terminating at least part of the training of the neural networks by predicting the performance from the tentative weight data.

Figure 2:
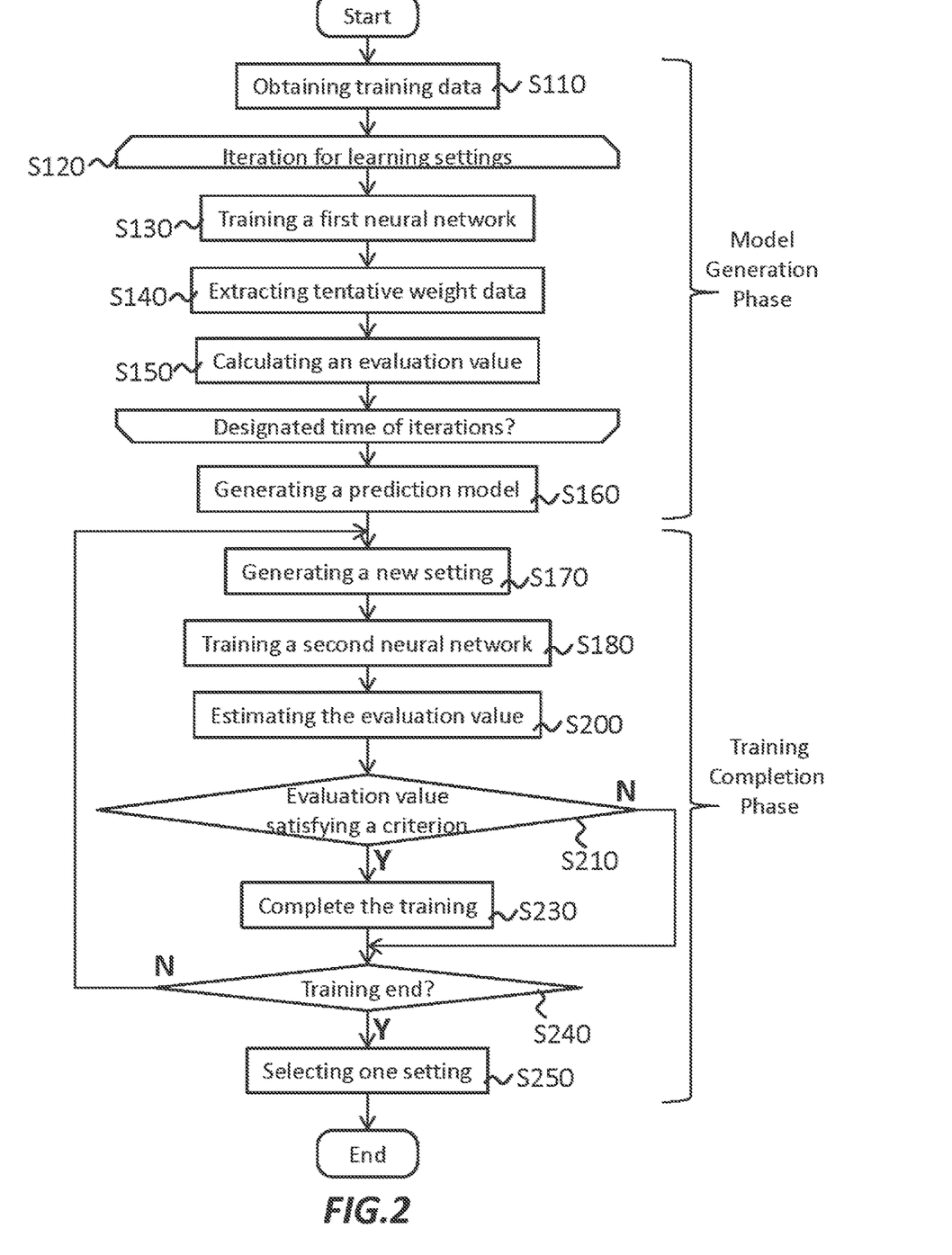
FIG. 2 shows an example operational flow of the apparatus 100 according to an embodiment of the present invention.

FIG. 2 shows an exemplary operational flow of the apparatus 100 according to an embodiment of the present invention. The present embodiment describes an example in which an apparatus, such as the apparatus 100, performs the operations from S110 to S250, as shown in FIG. 2, but operation flow may be performed by other apparatuses. FIG. 2 shows one example of the operational flow of the apparatus 100 shown in FIG. 1, but the apparatus 100 shown in FIG. 1 is not limited to using this operational flow.

The operational flow in FIG. 2 can be divided into a model generation phase, including operations S110-S160, and a training completion phase, including operations S170-250. In the model generation phase, the apparatus may generate a predictive model for predicting performance of the neural networks based on the tentative weight data. In the training completion phase, the apparatus may generate new settings and train neural networks for the new settings while terminating the training of neural networks in which evaluation does not satisfy a criterion.

At S110, a training section, such as the training section 110, may obtain training data for training neural networks. The training data may include at least one set of input data and desired output data corresponding to the input data. For example, the input data may be image data (e.g., image data of an animal) and the output data may be a classified category of the image data (e.g., a name of the animal shown in the image data).

At S120, the training section may start iterations of S120-S150. The training section may generate a different learning setting for each iteration of the operations S130-S150. The training section may iterate the operations of S120-S150 a designated number of times.

The learning setting is a setting used for training of first neural networks. The first neural network may be a neural network that is generated during the model generation phase. For example, the setting may be a hyper parameter or a set of hyper parameters of neural networks, which does not change after the training. In one embodiment, the setting may include a learning rate, dropout parameter, number of layers, and selection of activation functions.

In an embodiment of CNN, the setting may include one or more hyper parameters relating to a filter such as size (e.g., width and height), a number of pads (e.g., height of pad and width of pad) that specifies the number of pixels to implicitly add to each side of the input, and/or stride (e.g., height of stride and width of stride) that specifies the intervals to which to apply the filters to the input.

In the embodiment, the setting may include one or more hyper parameters relating to a pooling such as functions of the pooling, kernel size (e.g., height of kernel and width of kernel) that specifies height and width of each filter, and/or stride (e.g., height of stride and width of stride) that specifies the intervals to which to apply the filter to the input.

In the embodiment, the setting may include one or more hyper parameters relating to a local response normalization (or LRN) such as local size (e.g., the number of channels to sum over (for cross channel LRN) or the side length of the square region to sum over (for within channel LRN)), norm region (e.g., whether to sum over adjacent channels (across channel) or nearby spatial locations (within channel), and/or, scaling parameters $\alpha$ and $\beta$, wherein each input value is divided by:

$$\left(1+\left(\frac{\alpha}{n}\right)\sum_i x_i^2\right)^\beta,$$

wherein n is the size of each local region, and the sum is taken over the region centered at that value (zero padding is added where necessary). In the embodiment, the setting may also include a number of layers (e.g., the number of convolutional layers, the number of successive convolutional layers, and the number of fully-connected layers).

At S130, the training section may train a first neural network with the learning setting based on the training data. The training includes iterations of updating weight data of the first neural network. Each iteration of updating weight data may be referred to as an updating epoch. The total number of the iterations in each training is defined as T, which may be a designated integer. In other words, the training section may iterate updating of weight data in the first neural network T times.

The training section may provide an extracting section, such as the extracting section 120 with tentative weight data of the first neural network. For example, the tentative weight data may be weight data obtained from the neural network in which only t updating epochs of T iterations have been performed, where t is an integer satisfying 0<t<T.

The training section may provide the extracting section with a plurality of the tentative weight data of the neural networks at different updating epochs. For example, the training section may provide the extracting section with tentative weight data W(1), W(2), . . . , W(t). The training section may also provide a calculating section, such as the calculating section 130, with the training data and the weight data of a completely trained first neural network (e.g., the first neural network in which the T iterations have been completed).

At S140, the extracting section may extract the tentative weight data W(1), W(2), . . . , W(t) of the first neural network from the training section. In one embodiment, the tentative weight data W(t), which represents weight data of the neural network at the t-th updating epoch, includes a plurality of weight vectors for connections between neurons in different layers. For example, the tentative weight data W(t) includes a weight vector $w_{ij}^{l,l-1}(t)$ as a weight vector of the i-th node in layer "l" having I neurons and the j-th vector of in layer "l−1" having J neurons at the t-th iteration, where a value of l may be 2, 3, . . . , L, where L is the total number of layers of neural networks. The extracting section may provide a generating section, such as the generating section 150, with the tentative weight data.

At S150, the calculating section may calculate an evaluation value of the first neural network with the learning setting and weight data. For example, the calculating section may input the input data of the training data into the first neural network with the learning setting and weight data, and obtain the output data from the first neural network.

Then, the calculating section may calculate the evaluation value based on classification accuracy (e.g., a match rate) of the output data from the first neural network and the desired output data of the training data. Alternatively, the calculating section may calculate the evaluation value based on distance between the output data from the first neural network, and the desired output data of the training data. In another embodiment, the calculating section may use a test data for calculating the evaluation value of the first neural network, instead of the training data.

The calculating section may provide the generating section with the evaluation value. The calculating section may provide a selecting section such as the selecting section 190 with the evaluation value and the weight data of the first neural network.

At S160, the generating section may generate a predictive model for predicting an evaluation value of a second neural network with a new setting based on tentative weight data of the second neural network. The second neural network may be a neural network that is generated during the training completion phase. For example, the generating section may generate a function to estimate the evaluation value from the tentative weight data at two or more iterations of the plurality of iterations. In one embodiment, the two or more iterations may include a first iteration and a second iteration.

The generating function may generate a function operable to estimate the evaluation value from differences between the tentative weight data of the first iteration of the plurality of iterations and the tentative weight data of the second iteration of the plurality of iterations.

In one embodiment, the generating section may generate the function F represented by the tentative weight data $w^{l-1,l}(t)$ of the first iteration "t" and the tentative weight data $w^{l-1,l}(t-\tau)$ of the second iteration "t−τ" as shown in a formula (1) below:

$$F=g(\Delta w_\tau^{l-1,l}(t)) \quad (1)$$

where,
$\Delta w_\tau^{l-1,l}(t)=w^{l-1,l}(t)-w^{l-1,l}(t-\tau)$,
$w^{l-1,l}(t)=w_{11}^{l-1,l}(t), \ldots, w_{ij}^{l-1,l}(t), \ldots, w_{IJ}^{l-1,l}$,
$w^{l-1,l}(t-\tau)=w_{11}^{l-1,l}(t-\tau), \ldots, w_{ij}^{l-1,l}(t-\tau), \ldots, w_{IJ}^{l-1,l}(t-\tau)$,
and
$\tau=1, \ldots, t$.

The function g(*) computes a median value. The layer "l" may represent one or more of specific layers or all layers of the neural network. For example, if the layer "l" represents the a-th layer and the b-th layer, $\Delta w_\tau^{l-1,l}(t)$ may be equal to a subset of vectors $(w^{a-1,a}(t)-w^{a-1,a}(t-\tau))$ and a subset of vectors $(w^{b-1,b}(t)-w^{b-1,b}(t-\tau))$.

In another embodiment, the function F is represented as shown in a formula (2) below:

$$F=g_1(v_\tau^{l-1,l}(t)) \quad (2)$$

where
$v_\tau^{l-1,l}(t)=(v_{\tau,1}^{l-1,l}(t), \ldots, v_{\tau,i}^{l-1,l}(t), \ldots, v_{\tau,I}^{l-1,l}(t))$,
$v_{\tau,i}^{l-1,l}(t)=g_2(\Delta w_{\tau,i*}^{l-1,l}(t))$,
$\Delta w_{\tau,i*}^{l-1,l}(t)=w_{i*}^{l-1,l}(t)-w_{i*}^{l-1,l}(t-\tau)$,
$w_{\tau,i*}^{l-1,l}(t)=(w_{\tau,i1}^{l-1,l}, \ldots, w_{\tau,ij}^{l-1,l}(t), \ldots, w_{\tau,iJ}^{l-1,l}(t))$, and
$w_{\tau,i*}^{l-1,l}(t-\tau)=(w_{\tau,i1}^{l-1,l}(t-\tau), \ldots, w_{\tau,ij}^{l-1,l}(t-\tau), \ldots, w_{\tau,iJ}^{l-1,l}(t-\tau))$.

The function $g_1(*)$ computes standard deviation and the function $g_2(*)$ computes mean value.

In one embodiment, the two or more iterations may not be consecutive. In other words, "τ" may be an integer equal to or greater than 2.

In another embodiment, the function F is represented as shown in a formula (3) below:

$$F=g_1(x_\tau^{l-1,l}(t)) \quad (3)$$

where
$x_\tau^{l-1,l}(t)=(x_{\tau,1}^{l-1,l}(t), \ldots, x_{\tau,j}^{l-1,l}(t), \ldots, x_{\tau,J}^{l-1,l}(t))$,
$x_{\tau,j}^{l-1,l}(t)=g_2(\Delta w_{*j}^{l-1,l}(t))$,
$\Delta w_{\tau,*j}^{l-1,l}(t)=w_{*j}^{l-1,l}(t)-w_{*j}^{l-1,l}(t-\tau)$, and
$w_{\tau,*j}^{l-1,l}(t)=(w_{\tau,1j}^{l-1,l}(t), \ldots, w_{\tau,ij}^{l-1,l}(t), \ldots, w_{\tau,Ij}^{l-1,l}(t))$.
The function $g_1(*)$ computes median value or standard deviation, and the function $g_2(*)$ computes mean value.

When calculating an output value of the function F, the generating section may normalize the difference between the tentative weight data of a first iteration of the plurality of iterations and the tentative weight data of a second iteration of the plurality of iterations. For example, the generating section may normalize $\Delta w_\tau^{l-1,l}(t)$ by performing the normalization as shown in the formula (4), (5), or (6) below.

$$\Delta w_\tau^{l-1,l}(t) \leftarrow \frac{\Delta w_\tau^{l-1,l}(t)}{\|\Delta w_\tau^{l-1,l}(t)\|_a} \text{ where } a \text{ is 1 or 2} \quad (4)$$

$$\Delta w_{\tau,i*}^{l-1,l}(t) \leftarrow \frac{\Delta w_{\tau,i*}^{l-1,l}(t)}{\|\Delta w_{\tau,i*}^{l-1,l}(t)\|_a} \text{ for each } i, \text{ where } a \text{ is 1 or 2} \quad (5)$$

$$\Delta w_{\tau,*j}^{l-1,l}(t) \leftarrow \frac{\Delta w_{\tau,*j}^{l-1,l}(t)}{\|\Delta w_{\tau,*j}^{l-1,l}(t)\|_a} \text{ for each } j, \text{ where } a \text{ is 1 or 2} \quad (6)$$

Alternatively the generating section may normalize the tentative weight data of a first iteration of the plurality of iterations and the tentative weight data of a second iteration of the plurality of iterations, then estimate the difference between the normalized tentative weight data of a first iteration of the plurality of iterations and the normalized tentative weight data of a second iteration of the plurality of iterations.

The generating section may adopt calculation of entropy and/or basic statistics (e.g., mean, quantile, standard deviation, and/or moment skewness) for $g(*)$, $g_1(*)$, and/or $g_2(*)$ instead/in addition to the above embodiments. $\Delta w_\tau^{l-1,l}(t)$ may include one or more vectors corresponding to one or more of $\tau$. For example, $\Delta w_3^{l-1,l}(t)$ may be $(w^{l-1,l}(t)-w^{l-1,l}(t-3))$. In another embodiment, $\Delta w_3^{l-1,l}(t)$ may be summation or a subset of $(w^{l-1,l}(t)-w^{l-1,l}(t-1))$, $(w^{l-1,l}(t)-w^{l-1,l}(t-2))$, and $(w^{l-1,l}(t)-w^{l-1,l}(t-3))$.

The generating section may generate a predictive model that inputs an output value of the function F and that outputs the predicted evaluation value of the first neural network. The generating section may use methods such as Spearman's rank correlation coefficient, Pearson linear correlation coefficient, random forest algorism, or other regression analyses to generate the predictive model. The generating section may provide an estimating section, such as the estimating section 160, with the predictive model.

At S170, the training section may generate a new setting used for training of second neural networks. The second neural network may be a neural network that is generated during the training completion phase. Values of the new setting may be different from the values of the learning settings generated at S120.

At S180, the training section may incompletely train a second neural network with the new setting based on the training data. For example, the training section may iterate updating epochs to update weight data of the second neural network t times, which is less than T times. In other words, the training section may stop training of the second neural network at the t-th updating epoch. The training section may provide the extracting section with the tentative weight data of the second neural network at t-th updating epoch in the same manner as the operation of S140. The extracting section may provide the estimating section with the tentative weight data of the second neural network.

At S200, the estimating section may estimate the evaluation value of the second neural network at the T-th updating epoch with the new setting by using the predictive model. For example, the estimating section may estimate the evaluation value of the second neural network at the T-th updating epoch by inputting the tentative weight data at the t-th updating epoch of the second neural network into the predictive model.

In one embodiment, the estimating section may calculate the output value of the function F shown in one of the formulae (1)-(3) based on the tentative weight data at the t-th updating epoch of the second neural network, and estimate the evaluation value of the second neural network by inputting the output value of the function F into the predictive model. The estimating section may provide a terminating section, such as the terminating section 170, with the estimated evaluation value.

At S210, the terminating section may determine whether the estimated evaluation value satisfies a predetermined criterion or not. For example, the terminating section may determine whether the estimated evaluation value exceeds a threshold or not. If the determination is positive, then the terminating section proceeds with an operation of S230, and if the determination is negative, then the terminating section terminates the training of the second neural network by proceeding with an operation of S240.

At S230, the terminating section may complete training of the second neural network. For example, the terminating section may cause the training section to update the weight data for any remaining (T−t) updating epoch(s) from the weight data W(t) at the t-th updating epoch. After the completion of the training of the second neural network, the training section may provide the selecting section and the calculating section with the weight data and the new setting of the completely trained second neural network.

The calculating section may calculate an evaluation value of the completely trained second neural network with the new setting and weight data in the same manner as S150. The calculating section may provide the selecting section with the evaluation value of the second neural network.

At S240, the selecting section may determine whether to end the training completion phase or not. In one embodiment, the selecting section may determine whether a designated number of iterations of S170-S250 have been performed. In another embodiment, the selecting section may determine whether the evaluation value of at least one of the first neural networks and the second neural networks exceeds a threshold or not. If the decision is positive, then the selecting section may proceed with an operation of S250, and if the decision is negative, then the selecting section may go back to S170 to train a new second neural network with a new and different setting.

At S250, the selecting section may select one setting based on performance of neural networks in which training is not terminated. For example, the selecting section may select a neural network that has the best evaluation value among the first neural networks trained at S130 and the second neural networks in which training is not terminated by the terminating section at S210.

The number of iterations of S120-S150, which may be represented by P, may be smaller than the number of iterations of S170-S240, which may be represented by Q. In another embodiment, P may be equal or larger than Q.

After or on iterations of the operations S170-S240, the apparatus may update the predictive model based on the neural networks of which training is not terminated. For example, after Q/2 times of iterations of S170-S240 is done, the extracting section may extract the tentative weight data of the second neural network, and provide the generating section 150 with the tentative weight data in the same manner as S140.

The generating section may receive the evaluation value of the second neural network from the calculating section and update the predictive model by utilizing the evaluation value and the tentative weight data of the second neural network. In one embodiment, the generating section may generate the predictive model based on the evaluation values and the tentative weight data of (i) the first neural networks trained at the model generation phase and (ii) the completely trained second neural networks, which complete training at S230.

As explained above, the apparatus may generate the predictive model by completely training the first neural networks in the model generation phase of S110-S150. Then, the apparatus may predict the performance of incompletely trained second neural networks based on the predictive model, and completes the training if the estimated performance of a completely trained neural network is good in the training completion phase. The apparatus improves predictive accuracy by 20-30%, and decreases the number of iterations required to construct the accurate predictive model.

Figure 3:
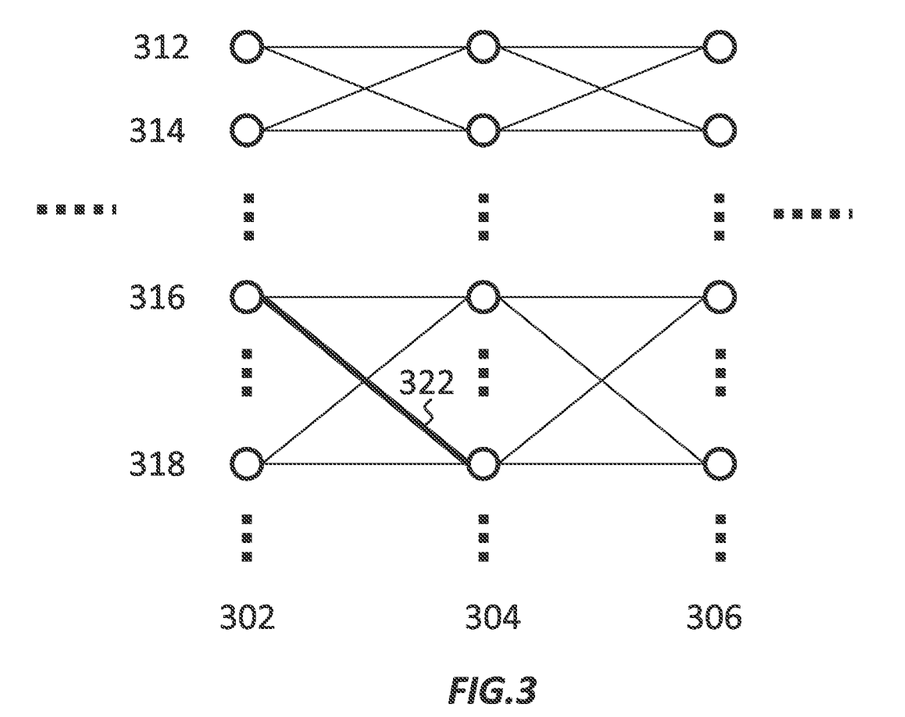
FIG. 3 shows an exemplary configuration of a neural network processed by the apparatus 100, according to an embodiment of the present invention.

FIG. 3 shows an exemplary configuration of a neural network processed by the apparatus 100. The neural network includes a plurality of layers, each of which includes one or more neurons. As shown in FIG. 3, a (l−1)-th layer 302, a l-th layer 304, and a (l+1)-th layer 306 may include a $1^{st}$ neuron 312, a $2^{nd}$ neuron 314, . . . , an i-th neuron 316, . . . , j-th neuron 318. The neurons in one layer may be connected to other neurons in the other layer. For example, i-th neuron 316 in l-th layer 304 may be connected to at least some neurons in (l−1)-th layer 302 and at least some neurons in (l+1)-th layer 306.

A weight vector may be assigned to each connection between two neurons. As shown in FIG. 3, a weight vector 322, $w_{ij}^{l-1,l}$, is assigned to a connection between the i-th neuron 316 of the (l−1)-th layer 302 and the j-th neuron 318 of the l-th layer 304. In one embodiment, the weight vector 322, $w_{ij}^{l-1,l}$ may be a size 1 vector, which is a scalar, or a size M×N vector, which consists of M×N weight parameters.

Figure 4:
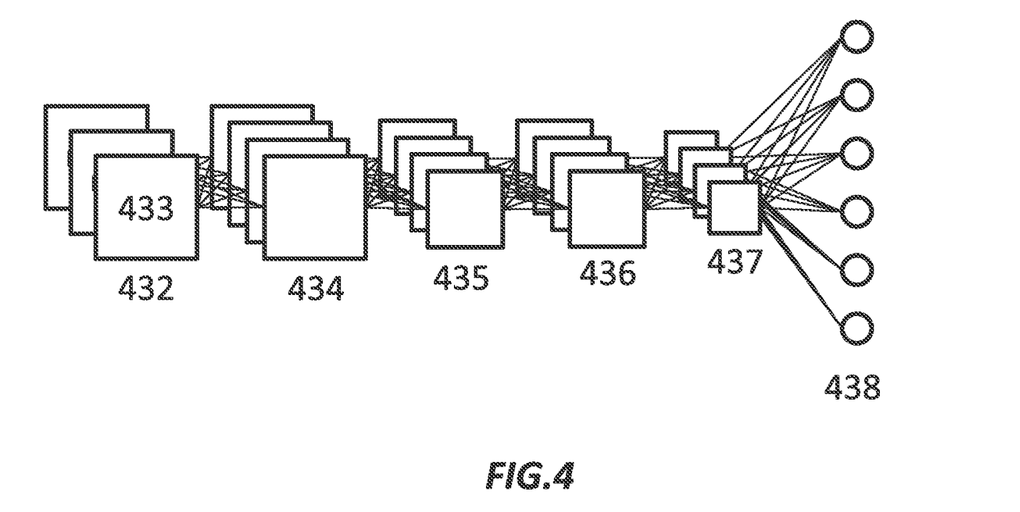
FIG. 4 shows an exemplary configuration of a convolutional neural network processed by the apparatus 100, according to an embodiment of the present invention.

FIG. 4 shows an exemplary configuration of a convolutional neural network processed by the apparatus 100. In one embodiment, the first and second neural networks may be convolutional neural networks.

As shown in FIG. 4, the convolutional neural network may include at least one convolutional layers 434, 436 and at least one pooling layers 435, 437. The first convolutional layer 434 may be directly or indirectly input into the input data 432 (such as image data 433). The last pooling layer 437 may be directly or indirectly output as the output data 438. There may be other layers between the input and the first convolutional layer 434 and/or between the pooling layer 437 and output layer 438.

The pooling layers 435, 437 may be positioned after the convolutional layers 434, 436. The convolutional neural network may include one or more sets of the convolutional layers 434, 436 and the pooling layers 435, 437. There may be one or more of additional fully connected layers between the pooling layer 437 and the output layer 438.

The convolutional layer 434, 436 output in the (a, b) component of neuron j may be calculated as shown in a formula (6) below:

$$y_{j,ab}^{l} = f(\Sigma_i \Sigma_{c=0}^{M-1} \Sigma_{d=0}^{N-1} w_{ij,cd}^{l-1,l} y_{i,(a+c)(b+d)}^{l-1} + b_j^l) \qquad (6)$$

where f is activation function and $b_j^l$ is bias input. In the embodiment, the weight vector $w_{ij}^{l-1,l}$, which is a size M×N vector having elements of $w_{ij,mn}^{l-1,l}$ may be used as a size M×N filter.

The apparatus may utilize the weight data between layers where weight is defined. In one embodiment, the apparatus may utilize a weight data from the first convolutional layer 434 to the input data, a weight data from the last convolutional layer 436 to the first pooling layer 435 and/or, a weight data from the output layer 438 to the last pooling layer 437. For example, the extracting section may extract at least part of the tentative weight data from the last convolutional layer. In a particular embodiment, the tentative weight data is extracted only from the last convolutional layer. The evaluation value tends to be more accurately estimated by the tentative weight data of the last convolutional layer than other layers. Thus, in the embodiment, the apparatus can accurately estimate the performance of the second neural networks.

Figure 5:
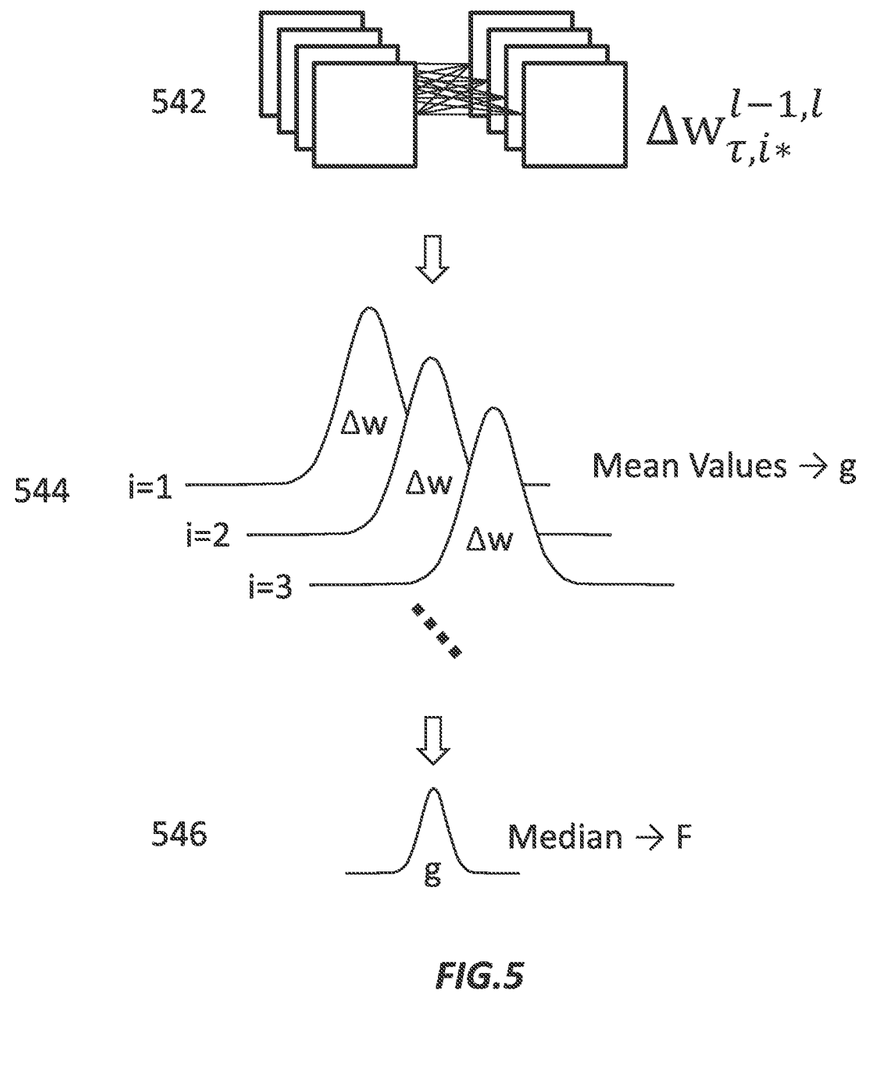
FIG. 5 shows an example of a function generated by the generating section 150, according to an embodiment of the present invention.
Figure 6:
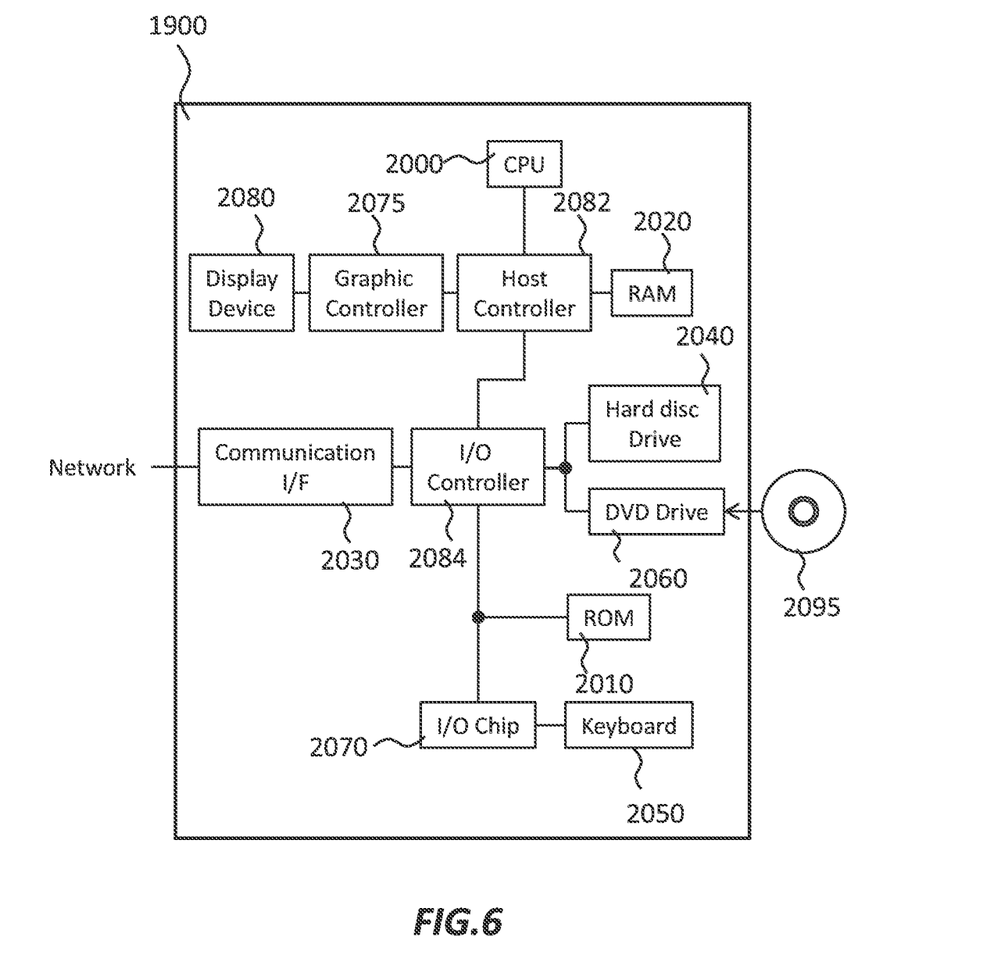
FIG. 6 shows an example of a computer 1900 in which the apparatus 100, the operational flow of FIG. 2, and/or other embodiments of the claimed invention may be wholly or partly embodied.

FIG. 5 shows an example of a function generated by a generating section, such as the generating section 150. To generate a predictive model for predicting an evaluation value of a second neural network with a new setting based on tentative weight data of the second neural network, the generating section may calculate an output value of the function F as shown in FIG. 5. First, the generating section may calculate $\Delta w_{\tau,i^*}^{l-1,l}$, as shown in 542, then calculate mean values from a distribution of $\Delta w_{\tau,i^*}^{l-1,l}$ for each i, as shown in 544, then calculate a median value of a distribution of the calculated mean values of $\Delta w_{\tau,i^*}^{l-1,l}$ as the output of the function F, as shown in 546. a FIG. 6 shows an example of a computer 1900 in which the apparatus 100, the operational flow of FIG. 2, and/or other embodiments of the claimed invention may be wholly or partly embodied.

The computer 1900 according to the present embodiment includes a CPU 2000, a RAM 2020, a graphics controller 2075, and a display apparatus 2080, which are mutually connected by a host controller 2082. The computer 1900 also includes input/output units such as a communication interface 2030, a hard disk drive 2040, and a DVD-ROM drive 2060, which are connected to the host controller 2082 via an input/output controller 2084. The computer also includes legacy input/output units such as a ROM 2010 and a keyboard 2050, which are connected to the input/output controller 2084 through an input/output chip 2070.

The host controller 2082 connects the RAM 2020 with the CPU 2000 and the graphics controller 2075, which access the RAM 2020 at a high transfer rate. The CPU 2000 operates according to programs stored in the ROM 2010 and the RAM 2020, thereby controlling each unit. The graphics controller 2075 obtains image data generated by the CPU 2000 on a frame buffer or the like provided in the RAM 2020, and causes the image data to be displayed on the display apparatus 2080. Alternatively, the graphics controller 2075 may contain therein a frame buffer or the like for storing image data generated by the CPU 2000.

The input/output controller 2084 connects the host controller 2082 with the communication interface 2030, the hard disk drive 2040, and the DVD-ROM drive 2060, which are relatively high-speed input/output units. The communication interface 2030 communicates with other electronic devices via a network. The hard disk drive 2040 stores programs and data used by the CPU 2000 within the computer 1900. The DVD-ROM drive 2060 reads the programs or the data from the DVD-ROM 2095, and provides the hard disk drive 2040 with the programs or the data via the RAM 2020.

The ROM 2010 and the keyboard 2050 and the input/output chip 2070, which are relatively low-speed input/output units, are connected to the input/output controller 2084. The ROM 2010 stores therein a boot program or the like executed by the computer 1900 at the time of activation, a program depending on the hardware of the computer 1900. The keyboard 2050 inputs text data or commands from a user, and may provide the hard disk drive 2040 with the text data or the commands via the RAM 2020. The input/output chip 2070 connects a keyboard 2050 to an input/output controller 2084, and may connect various input/output units via a parallel port, a serial port, a keyboard port, a mouse port, and the like to the input/output controller 2084.

A program to be stored on the hard disk drive 2040 via the RAM 2020 is provided by a recording medium as the DVD-ROM 2095, and an IC card. The program is read from the recording medium, installed into the hard disk drive 2040 within the computer 1900 via the RAM 2020, and executed in the CPU 2000.

A program that is installed in the computer 1900 may cause the computer 1900 to function as an apparatus, such as the apparatus 100 of FIG. 1. The program or module acts on the CPU 2000, to cause the computer 1900 to function as a section, component, element such as each element of the apparatus 100 of FIG. 1 (e.g., the training section 110, the extracting section 120, the calculating section 130, the generating section 150, the estimating section 160, the terminating section 170, the selecting section 190 and the like).

The information processing described in these programs is read into the computer 1900 such as the apparatus 100 of FIG. 1, to function as each section (e.g., the training section 190), which is the result of cooperation between the program or module and the above-mentioned various types of hardware resources. Moreover, the apparatus is constituted by realizing the operation or processing of information in accordance with the usage of the computer 1900.

For example, in response to communication between the computer 1900 and an external device, the CPU 2000 may execute a communication program loaded onto the RAM 2020, to instruct communication processing to a communication interface 2030, based on the processing described in the communication program.

The communication interface 2030, under control of the CPU 2000, reads the transmission data stored on the transmission buffering region provided in the recording medium, such as a RAM 2020, a hard disk drive 2040, or a DVD-ROM 2095, and transmits the read transmission data to a network, or writes reception data received from a network to a reception buffering region or the like provided on the recording medium. In this way, the communication interface 2030 may exchange transmission/reception data with the recording medium by a DMA (direct memory access) method, or by a configuration that the CPU 2000 reads the data from the recording medium or the communication interface 2030 of a transfer destination, to write the data into the communication interface 2030 or the recording medium of the transfer destination, so as to transfer the transmission/reception data.

In addition, the CPU 2000 may cause all or a necessary portion of the file of the database to be read into the RAM 2020 such as by DMA transfer, the file or the database having been stored in an external recording medium such as the hard disk drive 2040, the DVD-ROM drive 2060 (DVD-ROM 2095) to perform various types of processing onto the data on the RAM 2020. The CPU 2000 may then write back the processed data to the external recording medium by means of a DMA transfer method or the like. In such processing, the RAM 2020 can be considered to temporarily store the contents of the external recording medium, and so the RAM 2020, the external recording apparatus, and the like are collectively referred to as a memory, a storage section, a recording medium, a computer readable medium, etc.

Various types of information, such as various types of programs, data, tables, and databases, may be stored in the recording apparatus, to undergo information processing. Note that the CPU 2000 may also use a part of the RAM 2020 to perform reading/writing thereto on the cache memory. In such an embodiment, the cache is considered to be contained in the RAM 2020, the memory, and/or the recording medium unless noted otherwise, since the cache memory performs part of the function of the RAM 2020.

The CPU 2000 may perform various types of processing, onto the data read from a memory such as the RAM 2020, which includes various types of operations, processing of information, condition judging, search/replace of information, etc., as described in the present embodiment and designated by an instruction sequence of programs, and writes the result back to the memory such as the RAM 2020. For example, if performing condition judging, then the CPU 2000 may judge whether each type of variable shown in the present embodiment is larger, smaller, no smaller than, no greater than, or equal to the other variable or constant, and if the condition judging results in the affirmative (or in the negative), then the process branches to a different instruction sequence, or calls a sub routine.

In addition, the CPU 2000 may search for information in a file, a database, etc., in the recording medium. For example, if a plurality of entries, each having an attribute value of a first attribute is associated with an attribute value of a second attribute, are stored in a recording apparatus, then the CPU 2000 may search for an entry matching the condition whose attribute value of the first attribute is designated, from among the plurality of entries stored in the recording medium, and reads the attribute value of the second attribute stored in the entry, thereby obtaining the attribute value of the second attribute associated with the first attribute satisfying the predetermined condition.

The above-explained program or module may be stored in an external recording medium. Exemplary recording mediums include a DVD-ROM 2095, as well as an optical recording medium such as a Blu-ray Disk or a CD, a magneto-optic recording medium such as a MO, a tape medium, and a semiconductor memory such as an IC card. In addition, a recording medium such as a hard disk or a RAM provided in a server system connected to a dedicated communication network or the Internet can be used as a recording medium, thereby providing the program to the computer 1900 via the network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium, which may implement the storage section, may be, for example, but is not limited to, an electronic storage device, a magnetic storage device, an optical storage device, an electromagnetic storage device, a semiconductor storage device, or any suitable combination of the foregoing.

A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the users computer, partly on the users computer, as a stand-alone software package, partly on the users computer and partly on a remote computer or entirely on the remote computer or server. In the latter scenario, the remote computer may be connected to the users computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s).

In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the embodiment(s) of the present invention has (have) been described, the technical scope of the invention is not limited to the above described embodiment(s). It is apparent to persons skilled in the art that various alterations and improvements can be added to the above-described embodiment(s). It is also apparent from the scope of the claims that the embodiments added with such alterations or improvements can be included in the technical scope of the invention.

While the embodiment(s) of the present invention has (have) been described, the technical scope of the invention is not limited to the above described embodiment(s). It is apparent to persons skilled in the art that various alterations and improvements can be added to the above-described embodiment(s). It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

As made clear from the above, the embodiments of the present invention can be used to realize an efficient searching of optimized learning setting of neural network.

What is claimed is:

1. An apparatus comprising:
a processor; and
one or more computer readable mediums collectively including instructions that, when executed by the processor, cause the processor to:
extract tentative weight data from the first neural network with the learning setting;
calculate an evaluation value of the first neural network with the learning setting based on classification accuracy of output data from the first neural network and desired output data of the training data; and
generate a predictive model for predicting an evaluation value of a second neural network with a new setting based on tentative weight data of the second neural network by using a relationship between the tentative weight data of the first neural network and the evaluation value of the first neural network,
wherein generating the predictive model includes generating a function represented by a tentative weight data $w^{l-1,j}(t)$ of a first iteration "t" and a tentative weight data $w^{l-1,j}(t-\tau)$ of a second iteration "t-$\tau$" given by:

$$F = g(\Delta w_\tau^{l-1,j}(t))$$

where l is a layer, g computes a median value, and $\tau$ represents time.

2. The apparatus of claim 1, wherein the calculating the evaluation value calculates the evaluation value of the first neural network with the learning setting and weight data further trained from the tentative weight data.

3. The apparatus of claim 2, wherein the instructions further cause the processor to:
train the second neural network with the new setting; and
estimate the evaluation value of the second neural network with the new setting by using the predictive model before completion of training the second neural network with the new setting.

4. The apparatus of claim 3, wherein the instructions further cause the processor to:
terminate the training of the second neural network with the new setting in response to the evaluation value of the second neural network with the new setting not satisfying a criterion.

5. The apparatus of claim 2, wherein the training of the first neural network with the learning setting includes a plurality of iterations, and wherein the tentative weight data of the first neural network with the learning setting is updated in each of the plurality of iterations.

6. The apparatus of claim 5, wherein the generation of the predictive model includes generating a function to estimate the evaluation value from the tentative weight data at two or more iterations of the plurality of iterations.

7. The apparatus of claim 6, wherein the two or more iterations are not consecutive.

8. The apparatus of claim 6, wherein the function is operable to estimate the evaluation value from differences between the tentative weight data of a first iteration of the plurality of iterations and the tentative weight data of a second iteration of the plurality of iterations.

9. The apparatus of claim 8, wherein generating the predictive model further normalizes the tentative weight data of a first iteration of the plurality of iterations and the tentative weight data of a second iteration of the plurality of iterations.

10. The apparatus of claim 1, wherein generating the predictive model further normalizes the difference between the tentative weight data of a first iteration of the plurality of iterations and the tentative weight data of a second iteration of the plurality of iterations.

11. The apparatus of claim 10, wherein the tentative weight data is extracted only from the last convolutional layer.

12. The apparatus of claim 1, wherein the first and second neural networks are convolutional neural networks, and at least part of the tentative weight data is extracted from a last convolutional layer.

13. A computer-implemented method comprising:
training a first neural network with a learning setting;
extracting tentative weight data from the first neural network with the learning setting;
calculating an evaluation value of the first neural network with the learning setting based on classification accuracy of output data from the first neural network and desired output data of the training data; and
generating a predictive model for predicting an evaluation value of a second neural network with a new setting based on tentative weight data of the second neural network by using a relationship between the tentative weight data of the first neural network and the evaluation value of the first neural network,
wherein generating the predictive model includes generating a function represented by a tentative weight data $w^{l-1,j}(t)$ of a first iteration "t" and a tentative weight data $w^{l-1,j}(t-\tau)$ of a second iteration "t-$\tau$" given by:

$$F = g(\Delta w_\tau^{l-1,j}(t))$$

where l is a layer, g computes a median value, and $\tau$ represents time.

14. The computer-implemented method of claim 13, wherein the calculating the evaluation value including calculating the evaluation value of the first neural network with the learning setting and weight data further trained from the tentative weight data.

15. The computer-implemented method of claim 14, further comprising:
training the second neural network with the new setting; and
estimating the evaluation value of the second neural network with the new setting by using the predictive model before completion of training the second neural network with the new setting.

16. The computer-implemented method of claim 15, further comprising:
terminating the training of the second neural network with the new setting in response to the evaluation value of the second neural network with the new setting not satisfying a criterion.

17. A non-transitory computer program product comprising one or more computer readable mediums collectively including instructions that, when executed by the processor, cause the processor to:
train a first neural network with a learning setting;
extract tentative weight data from the first neural network with the learning setting;

calculate an evaluation value of the first neural network with the learning setting based on classification accuracy of output data from the first neural network and desired output data of the training data; and generate a predictive model for predicting an evaluation value of a second neural network with a new setting based on tentative weight data of the second neural network by using a relationship between the tentative weight data of the first neural network and the evaluation value of the first neural network, wherein generating the predictive model includes generating a function represented by a tentative weight data $w^{l-1,l}$ (t) of a first iteration "t" and a tentative weight data $w^{l-1,l}(t-\tau)$ of a second iteration "t–τ" given by:

$$F = g(\Delta w_\tau^{l-1,l}(t))$$

where l is a layer, g computes a median value, and τ represents time.

18. The non-transitory computer program product of claim 17, wherein the calculating the evaluation value calculates the evaluation value of the first neural network with the learning setting and weight data further trained from the tentative weight data.

19. The non-transitory computer program product of claim 18, wherein the instructions further cause the processor to:

train the second neural network with the new setting; and estimate the evaluation value of the second neural network with the new setting by using the predictive model before completion of training the second neural network with the new setting.

* * * * *